(12) United States Patent
Montag et al.

(10) Patent No.: US 10,661,233 B2
(45) Date of Patent: May 26, 2020

(54) METERING SYSTEM FOR SOLID PARTICULATE

(71) Applicant: Montag Investments, LLC, Emmetsburg, IA (US)

(72) Inventors: Roger A. Montag, Malcolm, NE (US); Isaac Mogler, West Bend, IA (US); Jason Fehr, Ottosen, IA (US)

(73) Assignee: MONTAG INVESTMENTS, LLC, Emmetsburg, IA (US)

( * ) Notice: Subject to any disclaimer, the term of this patent is extended or adjusted under 35 U.S.C. 154(b) by 0 days.

(21) Appl. No.: 15/981,079

(22) Filed: May 16, 2018

(65) Prior Publication Data

US 2018/0264418 A1 Sep. 20, 2018

Related U.S. Application Data

(62) Division of application No. 14/600,671, filed on Jan. 20, 2015, now Pat. No. 9,993,779.

(51) Int. Cl.
*B01F 3/06* (2006.01)
*G01F 11/00* (2006.01)
(Continued)

(52) U.S. Cl.
CPC .............. *B01F 3/06* (2013.01); *G01F 11/003* (2013.01); *B65G 53/16* (2013.01); *B65G 53/528* (2013.01)

(58) Field of Classification Search
CPC ......... B01F 3/06; B65G 53/16; B65G 53/528; G01F 11/003
See application file for complete search history.

(56) References Cited

U.S. PATENT DOCUMENTS 318,377 A * 5/1885 Latcha .................. F04D 23/003
34/588
557,058 A * 3/1896 Dodge .................. B65G 51/03
138/37
(Continued)

FOREIGN PATENT DOCUMENTS

CN 101828099 A 9/2010
CN 202497837 U 10/2012
(Continued)

OTHER PUBLICATIONS

"International Application No. PCT/US2015/012021 International Search Report and Written Opinion", dated May 5, 2015, 18 pages.
(Continued)

*Primary Examiner* — Tony G Soohoo
(74) *Attorney, Agent, or Firm* — Goodhue, Coleman & Owens, P.C.

(57) ABSTRACT

An improved air handing system for a particulate metering system is provided. The system includes a flow path with an inlet in communication with an intake and an outlet in communication with one or more discharge points. A blower can be in communication with the flow path at the intake and provide an air flow to the flow path. The system can include a plenum within the flow path and in fluid communication with the blower. A plurality of ports can be disposed on the plenum and within the flow path. Each of the ports can be in communication with a discharge point. The system can further include air flow directing members within the flow path. Each of the air flow directing members can be in communication with a separate one of the ports and one of the discharge points.

19 Claims, 18 Drawing Sheets

(51) Int. Cl.
*B65G 53/16* (2006.01)
*B65G 53/52* (2006.01)

(56) References Cited

U.S. PATENT DOCUMENTS

| | | | |
|---|---|---|---|
| 771,118 A * | 9/1904 | Bechtel et al. | B65G 69/00 251/154 |
| 1,630,317 A * | 5/1927 | Skonier | F16K 11/0525 126/299 R |
| 1,786,969 A * | 12/1930 | Der Heuel | A45D 20/44 137/266 |
| 1,805,940 A * | 5/1931 | Dolan | B65G 53/521 406/181 |
| 1,992,090 A * | 2/1935 | Pestalozza | B01F 3/06 423/497 |
| 2,395,973 A * | 3/1946 | McIntosh | F23L 17/16 137/533.31 |
| 2,452,898 A * | 11/1948 | Bourdette | F24D 5/08 137/875 |
| 2,793,914 A * | 5/1957 | Gardeniers | B01J 8/002 406/195 |
| 2,865,260 A * | 12/1958 | Lee | D21F 1/02 137/601.05 |
| 2,959,869 A * | 11/1960 | Ackerman | E01C 19/05 34/135 |
| 3,314,734 A * | 4/1967 | Lewis | A24C 5/392 406/173 |
| 3,373,973 A | 3/1968 | Schmidt-Holthausen | |
| 3,386,773 A * | 6/1968 | Ballard, Jr. | A24C 5/391 131/110 |
| 3,568,937 A | 3/1971 | Grataloup | |
| 3,596,805 A | 8/1971 | Farmery | |
| 3,606,097 A | 9/1971 | Wall | |
| 3,625,431 A | 12/1971 | Andersson | |
| 3,708,208 A * | 1/1973 | Fuss | B65G 53/06 406/144 |
| 3,710,983 A | 1/1973 | Ricciardi | |
| 3,893,515 A | 7/1975 | Sadler | |
| 3,894,721 A * | 7/1975 | Boenisch | B01F 11/0094 366/108 |
| 3,926,377 A | 12/1975 | Johnson | |
| 4,008,855 A | 2/1977 | van der Lely | |
| 4,020,991 A | 5/1977 | Dreyer | |
| 4,087,079 A | 5/1978 | Kramer | |
| 4,142,685 A | 3/1979 | Dreyer et al. | |
| 4,296,695 A | 10/1981 | Quanbeck | |
| 4,402,635 A | 9/1983 | Maruo | |
| 4,413,934 A * | 11/1983 | Kern | B65G 53/528 239/455 |
| 4,422,810 A * | 12/1983 | Boring | B65G 53/24 406/156 |
| 4,432,675 A | 2/1984 | Machnee | |
| 4,473,016 A | 9/1984 | Gust | |
| 4,479,743 A * | 10/1984 | Stahl | B65G 53/523 285/16 |
| 4,495,968 A * | 1/1985 | Kist | B65G 47/917 137/607 |
| 4,529,104 A | 7/1985 | Tyler | |
| 4,561,781 A | 12/1985 | Seymour | |
| 4,562,968 A | 1/1986 | Widmer et al. | |
| 4,569,486 A | 2/1986 | Balmer | |
| 4,583,883 A * | 4/1986 | Johanning | B65G 53/16 406/142 |
| 4,793,744 A | 12/1988 | Montag | |
| 4,801,210 A | 1/1989 | Gian | |
| 4,834,004 A | 5/1989 | Butuk et al. | |
| 4,900,157 A | 2/1990 | Stegemoeller et al. | |
| 5,018,869 A * | 5/1991 | Paul | B01F 13/0244 366/101 |
| 5,104,229 A * | 4/1992 | Paul | B01F 5/242 366/101 |
| 5,299,888 A | 4/1994 | Wysong et al. | |
| 5,592,889 A | 1/1997 | Bourgault | |
| 5,775,585 A | 7/1998 | Duello | |
| 5,913,602 A | 6/1999 | Steele | |
| 5,934,205 A * | 8/1999 | Gordon | B65G 53/523 110/101 R |
| 6,142,714 A | 11/2000 | Montag | |
| 6,305,835 B1 | 10/2001 | Farrar et al. | |
| 7,344,298 B2 | 3/2008 | Wilmer et al. | |
| 7,854,066 B2 | 12/2010 | Wendte | |
| 8,336,469 B2 | 12/2012 | Preheim et al. | |
| 8,616,761 B2 | 12/2013 | McLaughlin et al. | |
| 9,681,602 B2 | 6/2017 | Montag et al. | |
| 9,781,878 B2 | 10/2017 | Montag | |
| 2003/0161694 A1* | 8/2003 | Bauver | B65G 53/528 406/1 |
| 2005/0024988 A1 | 2/2005 | Hoff et al. | |
| 2012/0186501 A1* | 7/2012 | Zamescu | B65G 53/528 110/101 R |
| 2012/0211508 A1 | 8/2012 | Barsi et al. | |
| 2012/0230778 A1* | 9/2012 | Petit | B65G 53/16 406/89 |
| 2016/0207015 A1 | 7/2016 | Montag et al. | |
| 2016/0207016 A1* | 7/2016 | Montag | G01F 11/003 |
| 2016/0207018 A1 | 7/2016 | Montag et al. | |
| 2016/0207718 A1* | 7/2016 | Montag | G01F 11/003 |

FOREIGN PATENT DOCUMENTS

CN  103349930 A  10/2013
CN  104923097 A  9/2015

OTHER PUBLICATIONS

"International Application No. PCT/US2015/012050 International Search Report and Written Opinion", dated May 5, 2015, 17 pages.

* cited by examiner

METERING SYSTEM FOR SOLID PARTICULATE

CROSS-REFERENCE TO RELATED APPLICATIONS

This application is a Divisional Application of U.S. Ser. No. 14/600,671 filed Jan. 20, 2015, herein incorporated by reference in its entirety.

BACKGROUND

I. Field of the Disclosure

A metering system for solid particulate is disclosed. More specifically, but not exclusively, an air production and handling system for a metering system with variable blend and variable application rate controls for particulate matter, such as dry fertilizers, is disclosed.

II. Description of the Prior Art

Particulate metering systems often use pneumatics to meter particulate to a field. More specifically, a flow of air generated by an air source, such as a blower, is directed through an airflow path, after which particulate enters the airflow. Thereafter, the air-particulate mixture is directed to a discharge point and metered to the field. Particulate metering is complicated by the desire to simultaneously meter at separate discharge points with varying rates and blends of different particulate. In most instances of multi-row metering, the distances vary from the air source to the discharge points of each unit row. Therefore, further complications arise with generating sufficient airflow to meter particulate to the unit rows while maintaining consistent application rates. Still further, the particulate traveling through an airflow path of the metering implement experiences wall friction, requiring greater upstream air pressure and increased power consumption to meter the particulate. Losses and frictional effects within the system also increase the likelihood of lag and clogging. Many desire to reduce the power consumption of the particulate metering implement while controlling and/or ensuring consistent application rates across all of the unit rows.

SUMMARY

The present disclosure provides an air handing system for a particulate metering system. The air handling system includes a flow path with an inlet in communication with an intake and an outlet in communication with one or more discharge points. A blower can be in communication with the flow path at the intake. The blower provides an air flow to the flow path. A plenum within the flow path and in fluid communication with the blower is provided. A plurality of ports can be disposed on the plenum and within the flow path. Each of the ports can be in communication with a discharge point. The system includes air flow directing members within the flow path. Each of the air flow directing members can be in communication with a separate one of the ports and one of the discharge points. The plenum is shaped to provide graduations and to proportion the air flow velocity across the ports.

The system can include at least one directional bend in the flow path within each of the air flow directing members. Further, a plurality of particulate ports can be connected to each of the air flow directing members. Each of the particulate pol is conveys particulate into the flow path.

The system can further include a mixing area comprised of a confluence of particulate and the flow path within each of the air flow directing members. The mixing area can occur after a directional bend in the flow path within each of the air flow directing members.

According to another aspect of the disclosure, the air handling system includes an air origin generating an air flow path. A plenum having a plurality of discharge ports is provided. The plenum can be in fluid communication with the air origin and comprise a first portion of the air flow path. The system can include a plurality of particulate accelerators comprising a second portion of the air flow path. Each of the particulate accelerators is connected to one of the discharge ports of the plenum. Further, each of the particulate accelerators can be comprised of an air inlet, a plurality of particulate inputs, an air-particulate output, and a flow-directing member. The system can further include a plurality of discharge lines comprising a third portion of the air flow path. Each of the discharge lines can be connected to the air-particulate output of each of the particulate accelerators. The flow-directing member of each of the particulate accelerators imparts at least one directional bend in the air flow path within each of the particulate accelerators.

The particulate accelerators can have a flow angle defined between a direction of the air flow path at the inlet and a direction of the air flow path at the air-particulate output. The flow angle can be acute. Further, the flow-directing member of each of the particulate accelerators suspends particulate being suspended within a fluid bed within each of the discharge lines.

According to yet another aspect of the disclosure, a plurality of particulate accelerators is provided. Each of the plurality of particulate accelerators can include an inlet configured to receive a flow of air from an air source and an outlet configured to provide a flow of a mixture of the flow of air and one or more types of particulate. Each of the particulate accelerators can include a main body associated with the inlet and the outlet. The main body can have a curvilinear back wall and define an enclosed volume. The main body of each of the particulate accelerators can be substantially cylindrical. Each of the particulate accelerators can further include a plurality of side openings disposed on the main body. Each of the plurality of side openings can be configured to receive a type of particulate from one of a plurality of particulate sources. Each of the particulate accelerators can still further include a mixing area comprised of a portion of the enclosed volume of the main body below the side openings. The curvilinear back wall can impart at least one directional bend in the flow of air between the inlet and the mixing area. A confluence of the particulate and the flow of air occurs within the mixing area.

A plenum in fluid connection with the air source and the plurality of particulate accelerators is provided. The plenum can have a plurality of ports. The inlet of one of the particulate accelerators is connected to one of the ports on the plenum. The air source provides the flow of air to each of the particulate accelerators.

BRIEF DESCRIPTION OF THE DRAWINGS

Illustrated embodiments of the disclosure are described in detail below with reference to the attached drawing figures, which are incorporated by reference herein, and where:

FIG. 1 is a front perspective view of a particulate metering implement in accordance with an illustrative embodiment;

DETAILED DESCRIPTION

Figure 1:
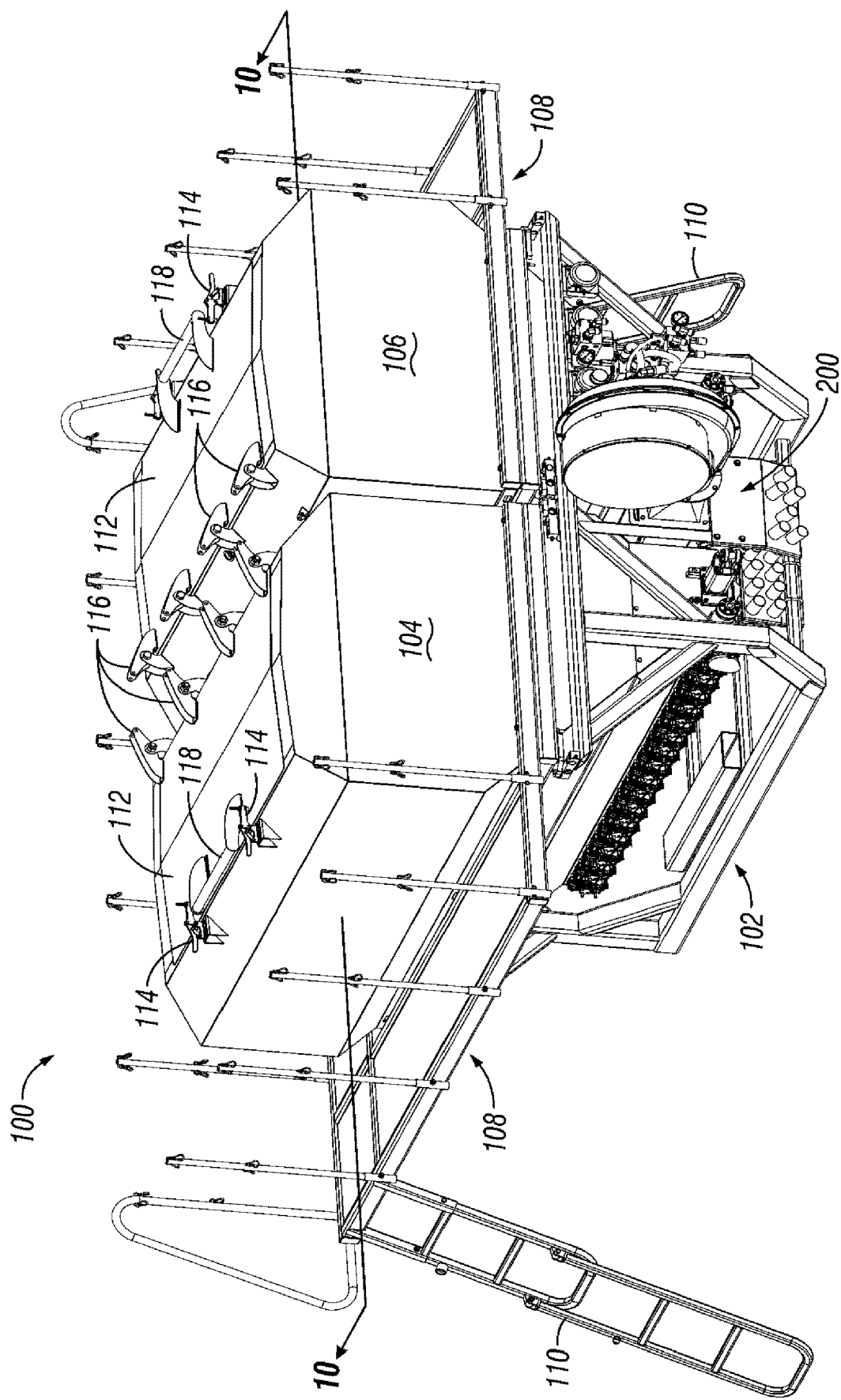

FIG. 1 illustrates a particulate metering implement 100. While the figure shows a particulate metering implement, it should be appreciated by those skilled in the art that the disclosure covers other types of implements, including but not limited to, seed meters, seed planters, nutrient applicators, and other agricultural equipment. The implement 100 can be mounted upon a towable trailer or other suitable structure such as a toolbar, or integrally formed with a particulate application system. The implement can include a frame assembly 102, upon which particulate containers 104 and 106 can be mounted. For user accessibility to the particulate containers 104 and 106, a platform 108 and ladders 110 can 10 be provided.

A top surface of the particulate containers 104 and 106 can include openings (not shown) covered by one or more lids 112. The lids 112 can be opened and/or removed to permit loading of particulate into and/or servicing the particulate containers 104 and 106. In an exemplary embodiment, an edge of the lids 112 can be pivotally connected to the particulate containers 104 and 106 with one or more hinges 116. One or more clamps 114 can be mounted on the particulate containers 104 and 106 proximate to the opposing edge of the lids 112 to releasably secure the lids to the containers. To assist in opening the lids 112, a handle 118 can be connected to the lids 112 proximate to the clamps 114. Upon opening and/or removal of the lids 112, one or more screens (now shown) can be disposed within the openings of the particulate containers 104 and 106 to prevent debris from entering the same.

The particulate metering implement 100 can include an air production and handling system 200. The air production and handling system 200 can be disposed between and below a portion of the particulate containers 104 and 106.

Figure 2A:
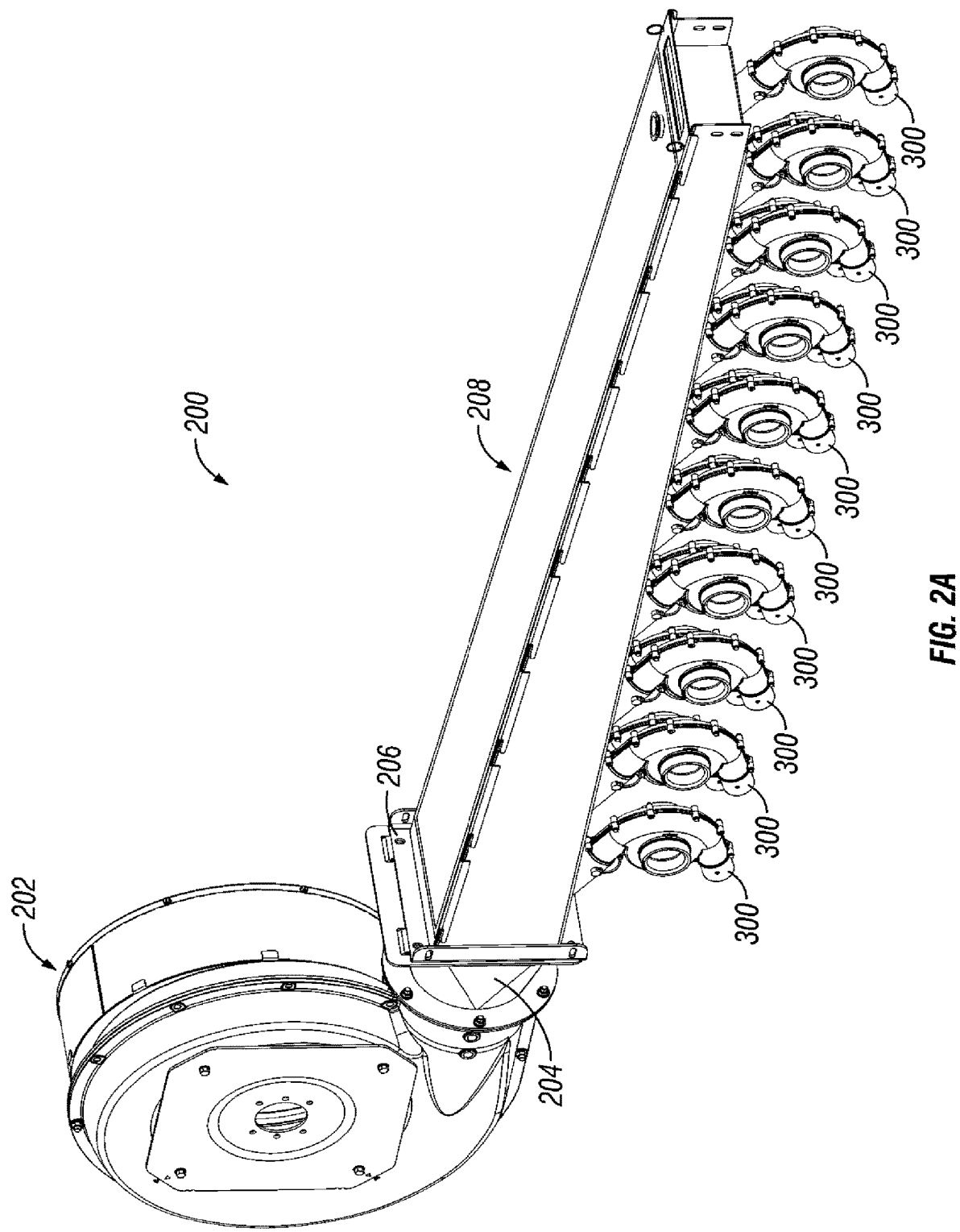
FIG. 2A is a front perspective view of an air production and handling system in accordance with an illustrative embodiment.
Figure 2B:
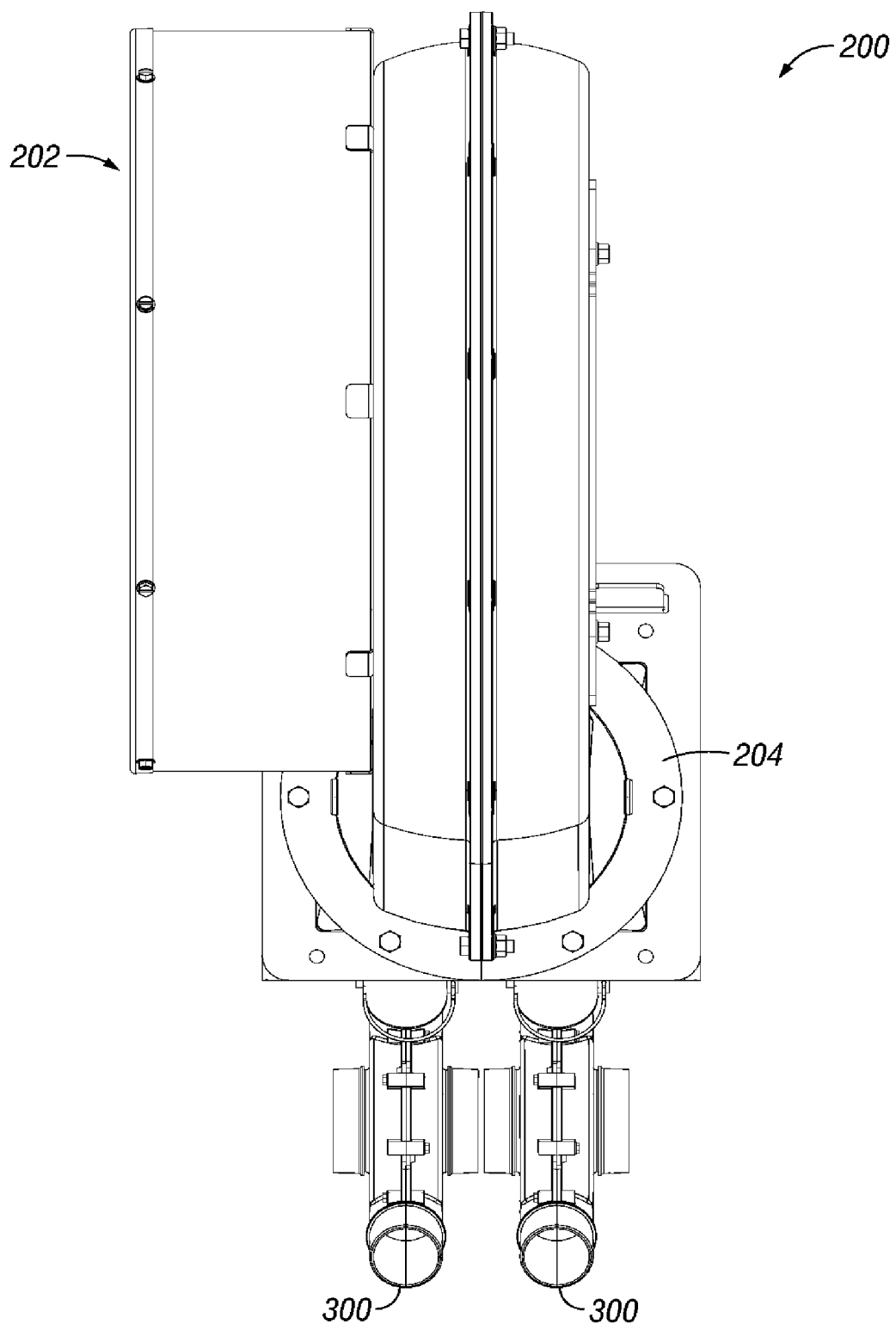
FIG. 2B is a front elevation view of an air production and handling system in accordance with an illustrative embodiment.

Referring to FIGS. 2A and 2B, an exemplary air production and handling system 200 is illustrated. The air production and handling system 200 can include a blower 202 driven by a blower motor (not shown) to produce an airflow. In an embodiment, a representative blower can operate at 20 horsepower (HP) and produce a volumetric flow rate 120-150 cubic feet per minute (CFM) per row in operation. The disclosure also contemplates the blower 202 operating at variable revolutions per minute (RPM). In such instances, the blower 202 can require less horsepower than operating at a constant RPM. Operating the blower 202 at a constant RPM and/or variable RPM can be tailored to the specific demands of a given application.

The blower 202 can be coupled to a plenum 208 via an extension 204 and a bracket 206. As shown illustratively in FIG. 4, the extension 204 can have an inlet 222 and an outlet 224. The inlet 222 side of the extension 204 can be connected to the blower 202 at a flanged interface 218 via corresponding mounting holes on the extension 204 and the blower 202. The mounting holes 232 configured to be joined by nuts and bolts, or other means such as pinning, clamping, and the like. The extension 204 can be comprised of a plurality of triangular-shaped surfaces 226 designed to impart desired flow properties as air enters the plenum 208. The disclosure envisions alternative characteristics for the extension 204, including but not limited to, a circular cross-section, a nozzle, an expander, and the like. The extension 204 can be made of steel, but the disclosure contemplates other materials such as aluminum, polymers, composites, ceramics, and the like. An outlet 224 side of the extension 204 can have a flanged plate 220 with slots 228. The plate 228 can connect the extension 204 to the bracket 206 through the slots 228 and connecting holes 230, as shown illustratively in FIGS. 3 and 4.

Figure 3:
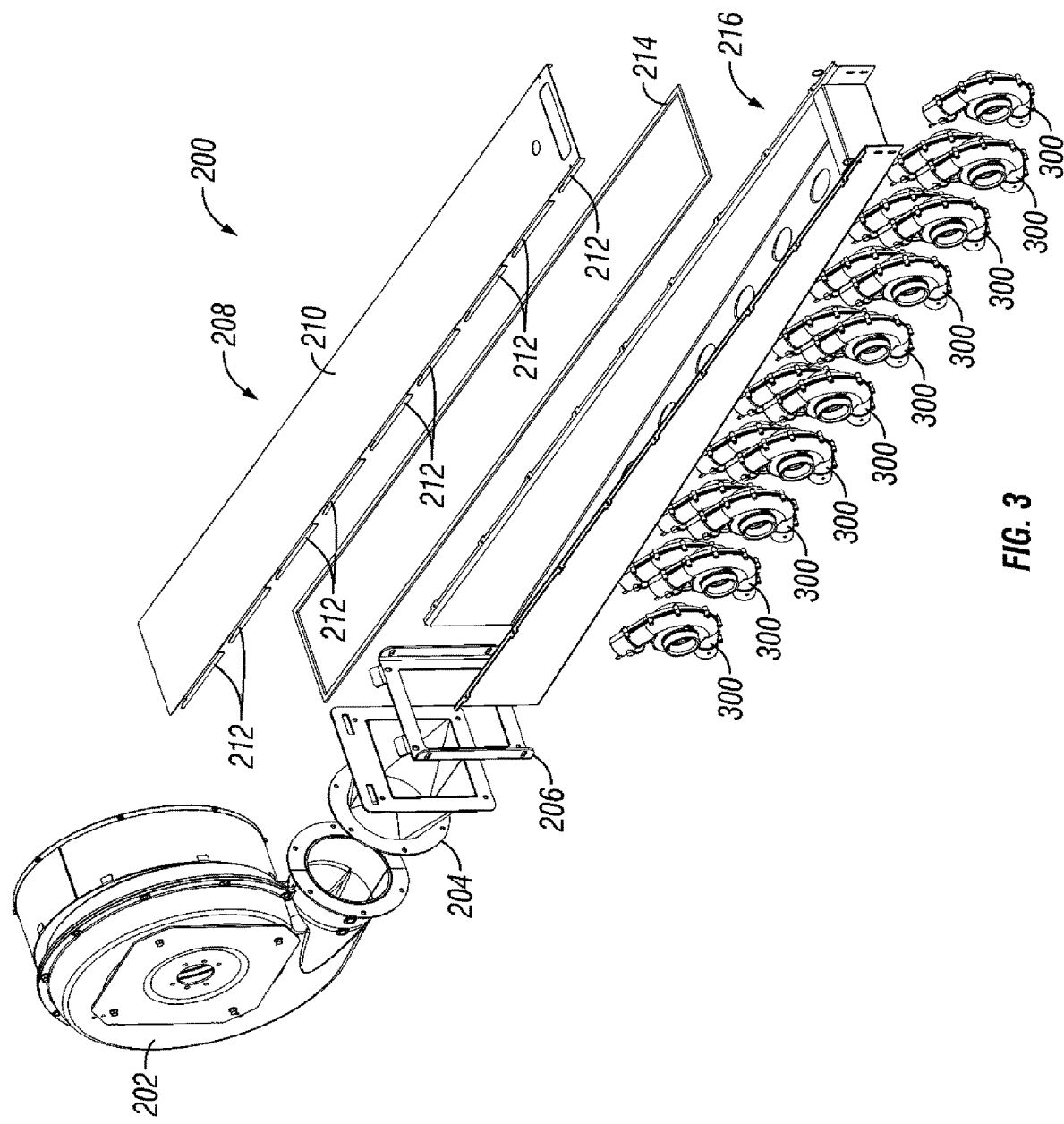
FIG. 3 is an exploded front perspective view of an air production and handling system in accordance with an illustrative embodiment.
Figure 4:
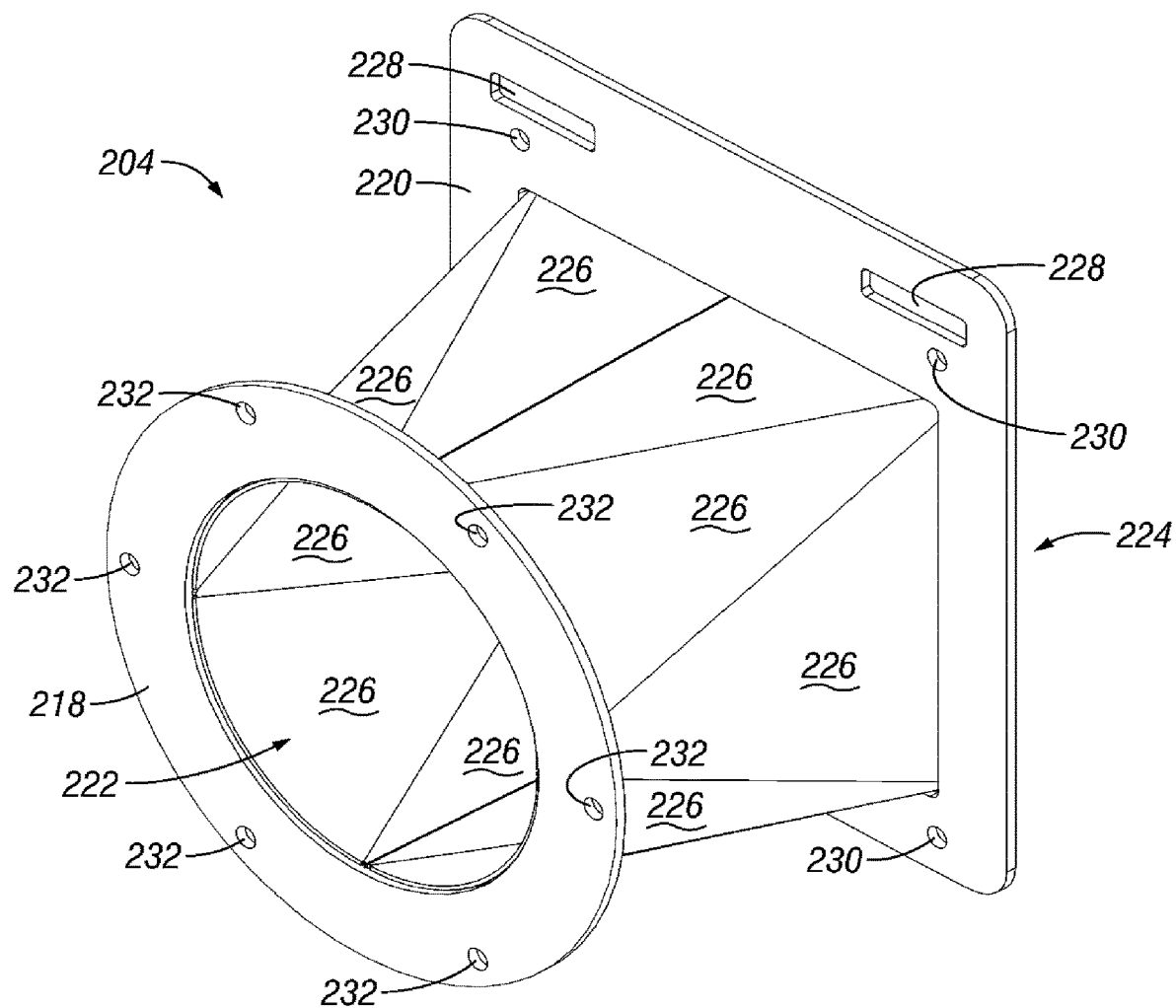
FIG. 4 is an isometric view of an expander in accordance with an illustrative embodiment.
Figure 5:
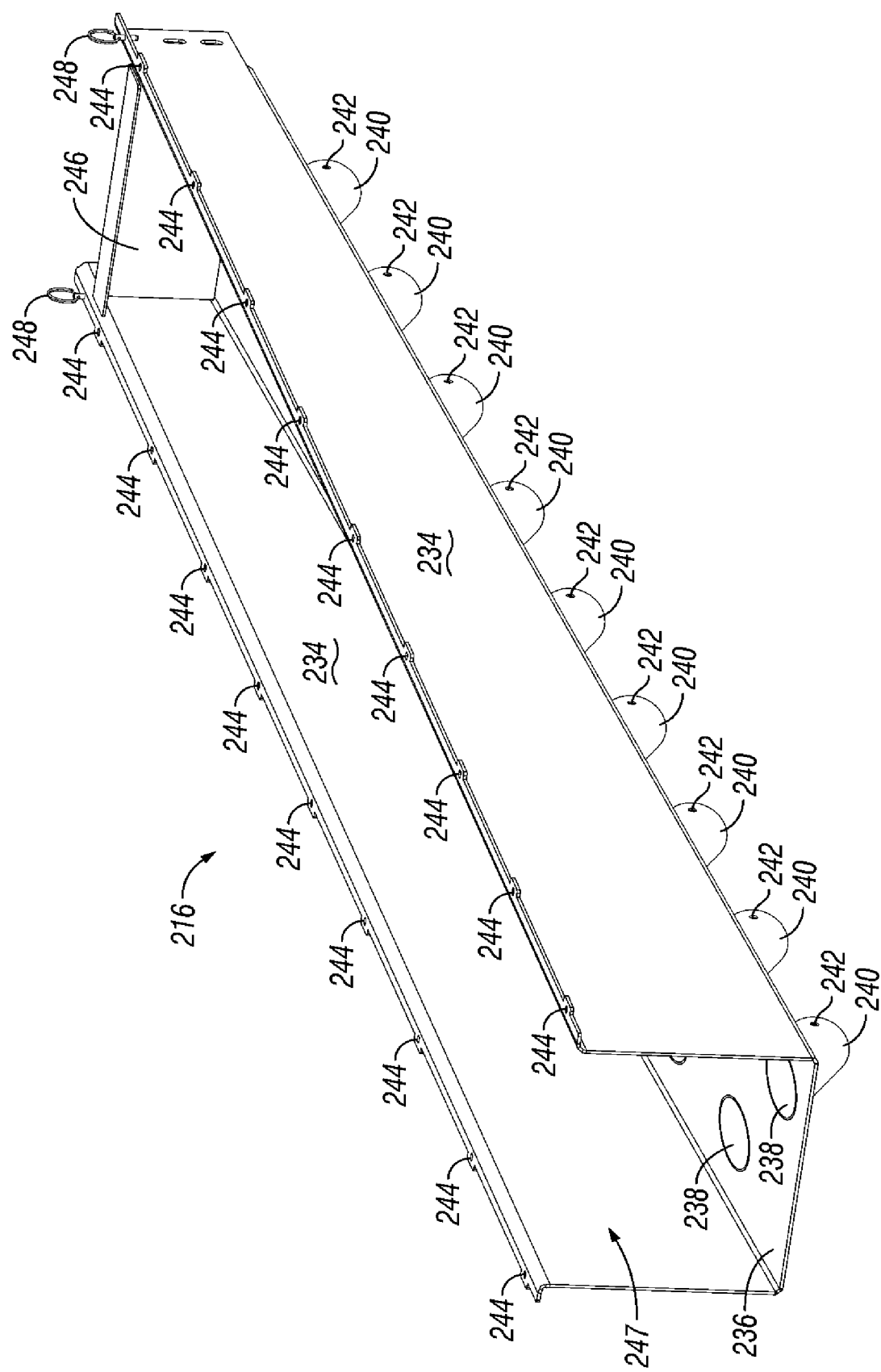
FIG. 5 is a front perspective view of a plenum base in accordance with an illustrative embodiment.
Figure 6:
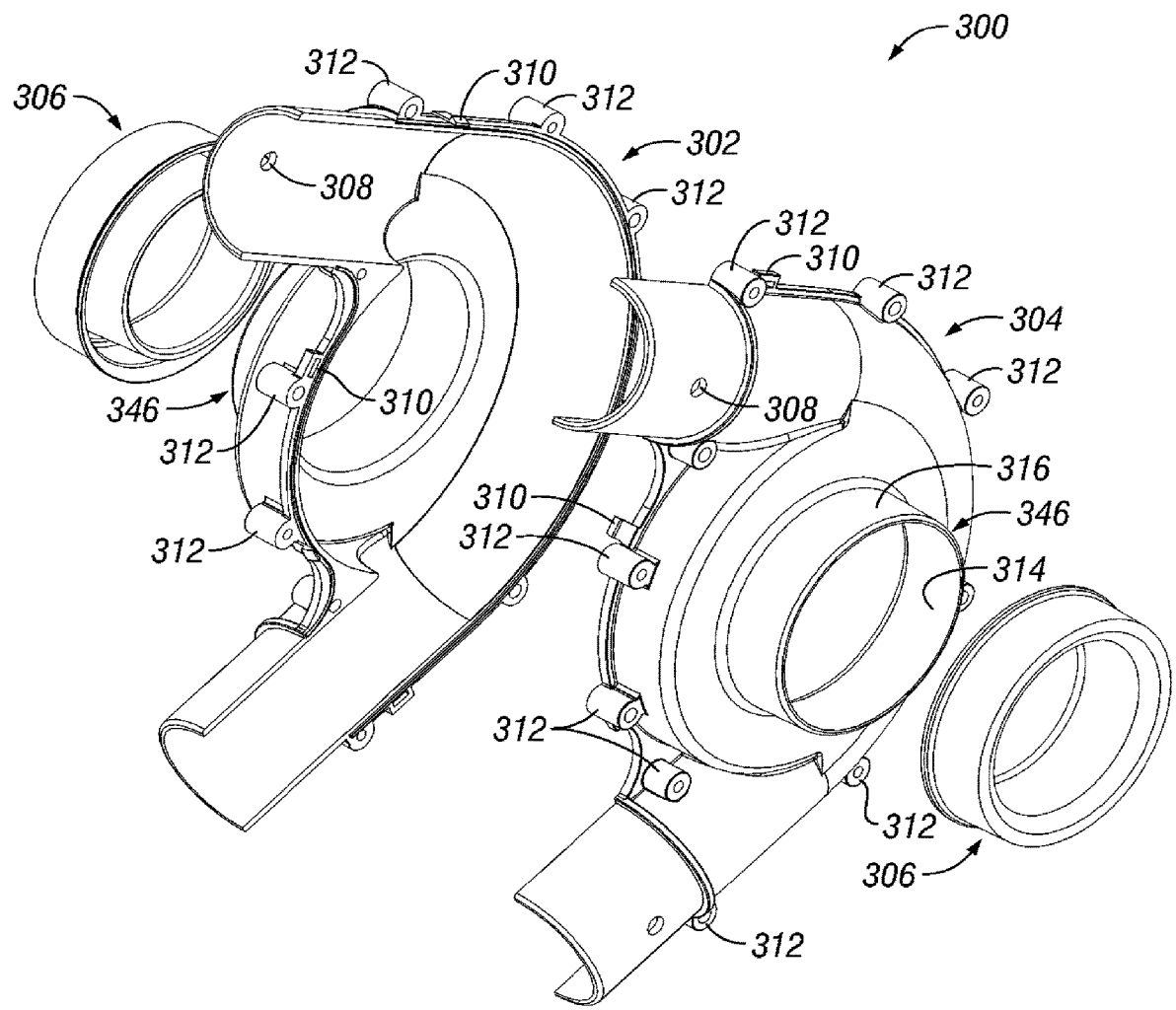
FIG. 6 is an exploded front perspective view of a particulate accelerator in accordance with an illustrative embodiment.
Figure 7A:
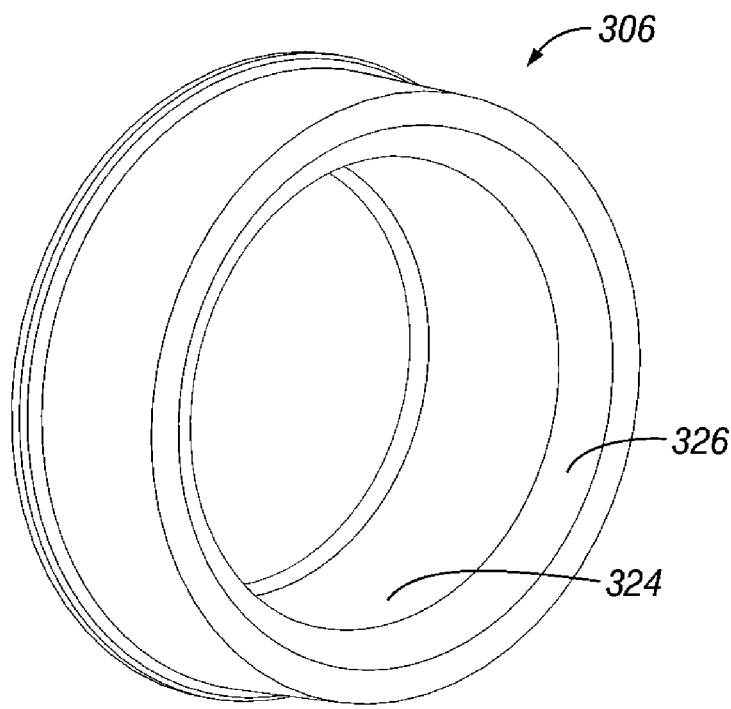
FIG. 7A is a front perspective view of a gasket in accordance with an illustrative embodiment.
Figure 7B:
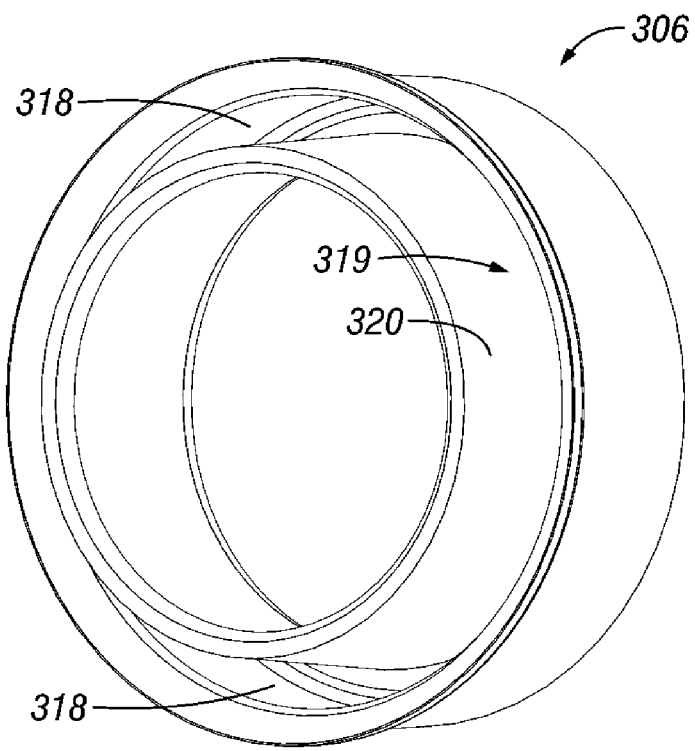
FIG. 7B is a rear perspective view of a gasket in accordance with an illustrative embodiment.
Figure 8A:
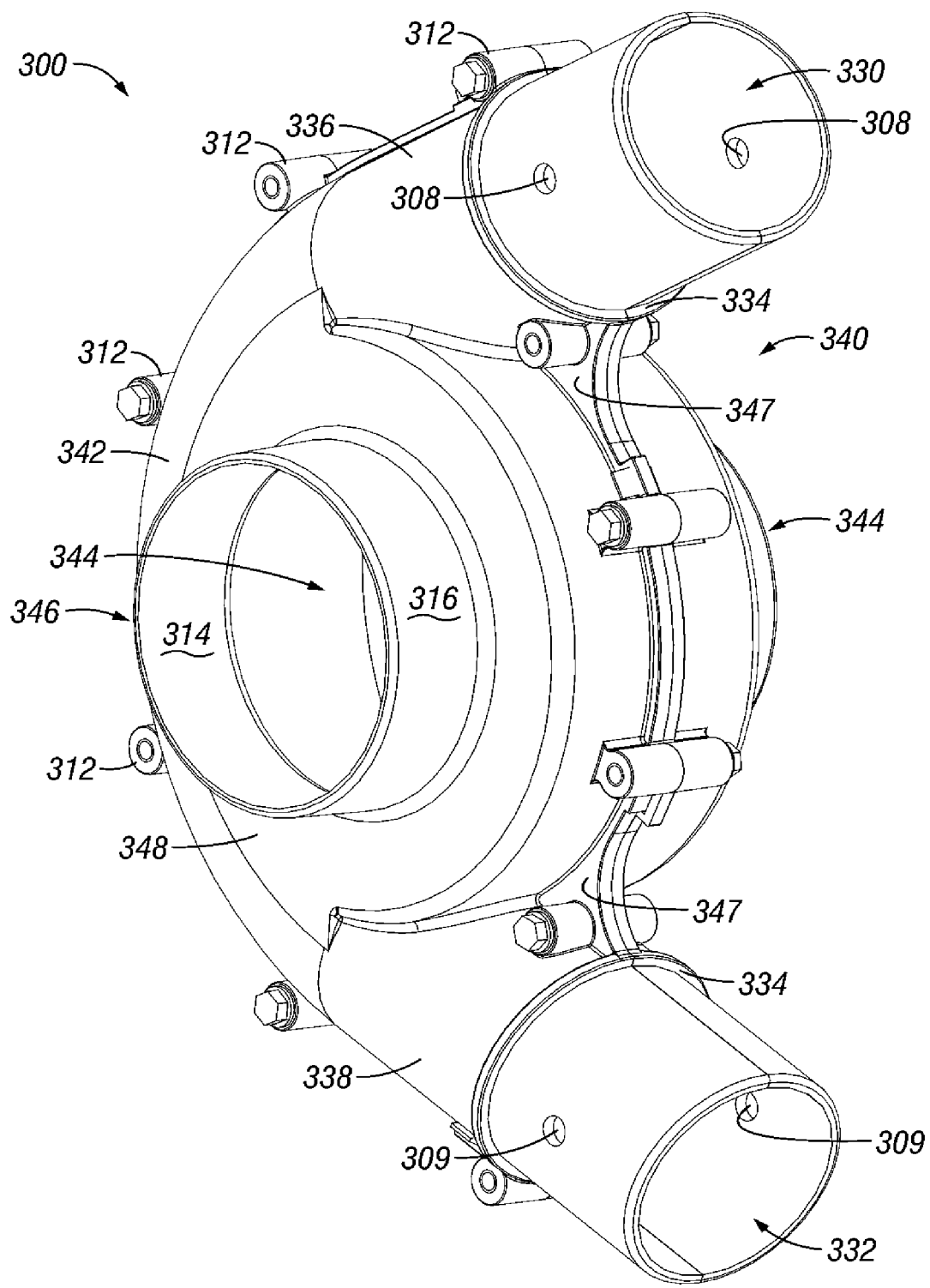
FIG. 8A is a front perspective view of a particulate accelerator in accordance with an illustrative embodiment.
Figure 8B:
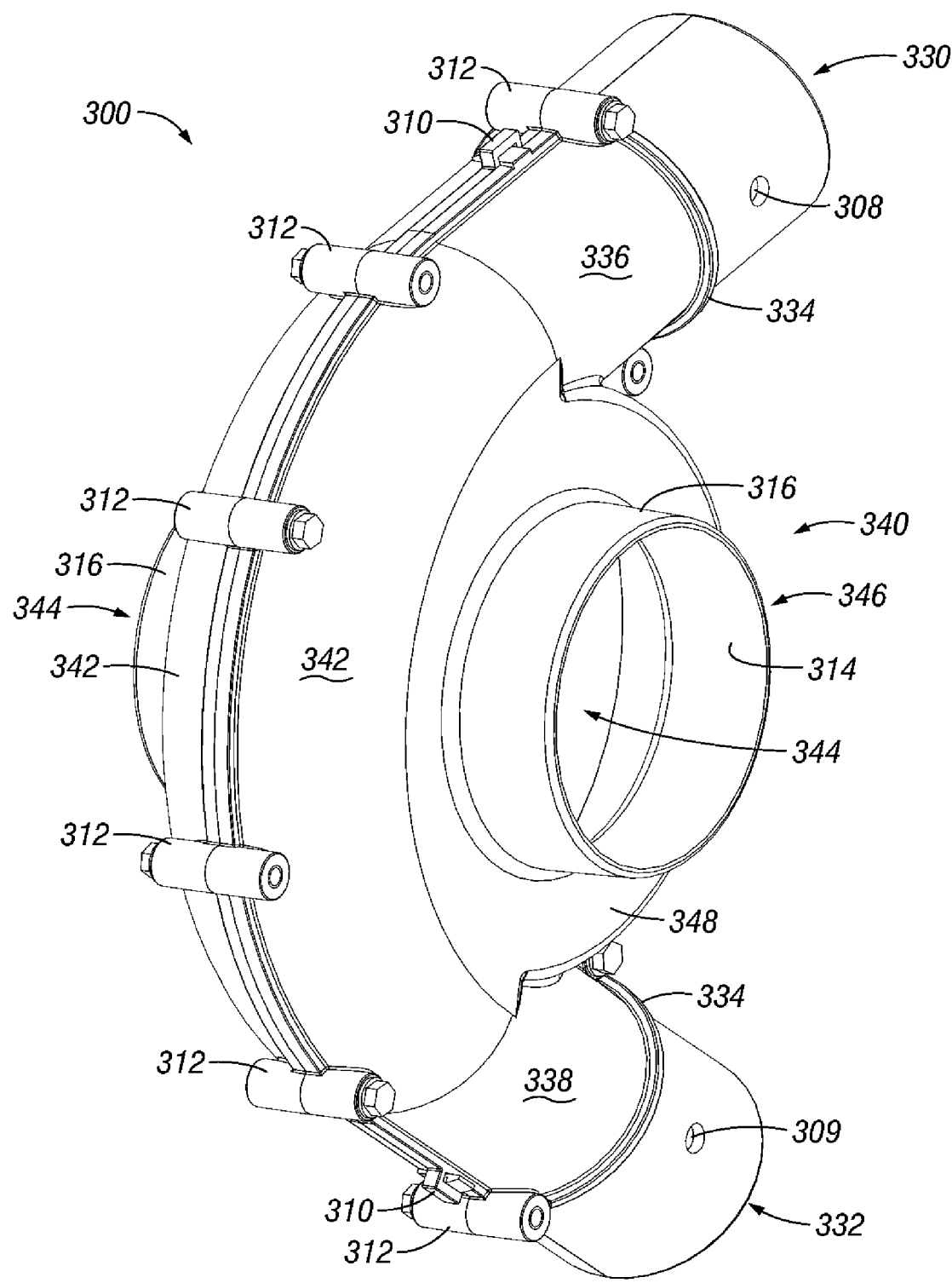
FIG. 8B is a rear perspective view of a particulate accelerator in accordance with an illustrative embodiment.
Figure 8C:
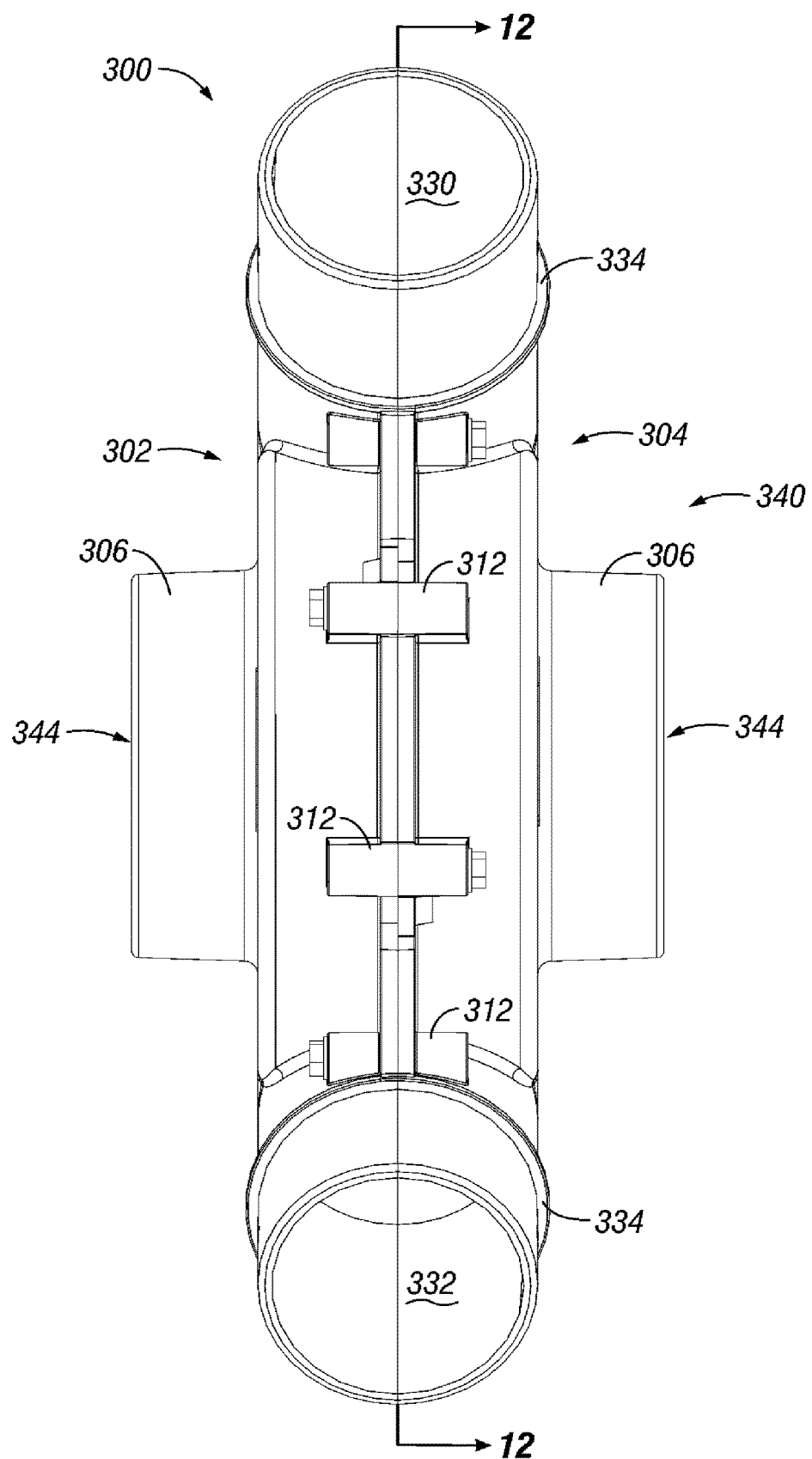
FIG. 8C is a front elevation view of a particulate accelerator in accordance with an illustrative embodiment.

After exiting the extension 204, the air generated by blower 202 can enter an intake 247 of a plenum 208 of the air production and handling system 200, as shown illustratively in FIGS. 3 and 5. The plenum 208 can include a plenum cover 210 removably connected to a plenum base 216. When installed, the plenum cover 210 can be sealed to the plenum base 216 with a gasket 214 contoured to outer edges of the same. To install or uninstall the plenum cover 210, the plenum cover can include a plurality of downwardly extending flanges 212 adapted to mate with flanges 244 extending outwardly along the length of the sidewalls 234 of the plenum base 216. In particular, gaps between the flanges 244 on the plenum base 216 can receive to the plurality of downwardly extending flanges 212 on the plenum cover 210, after which the plenum cover 210 can be slid laterally into a locked position. Thereafter, pins 248 can be installed to ensure the plenum cover 210 remains in the locked position.

As shown illustratively in FIG. 5, the plenum base 216 can contain opposing sidewalls 234, a bottom wall 236 and a distal wall 246. A plurality of apertures 238 can be disposed within the bottom wall 236 of the plenum base 216. The plurality of apertures 238 can be arranged in two rows along the length of the plenum 208. The two rows of apertures 238 along the length of the plenum base 216 can be staggered longitudinally, as shown illustratively in FIGS. 2A, 3 and 5, to maximize compactness of the particulate accelerators 300 disposed below the plenum and/or to impart the desired airflow characteristics within the plenum 208. The plurality of apertures 238 can be elliptical in shape. The disclosure, however, envisions other arrangements and/or shapes of the plurality of apertures without detracting from the objects of the disclosure. For example, the plurality of apertures 238 can be arranged in one row along the length of the plenum base 216, or the plurality of apertures 238 can be circular or rectangular in shape. The disclosure also contemplates the plurality of apertures disposed the sidewalls 234 and/or 10 the plenum cover 210.

The sidewalls 234 can be trapezoidal in shape. In other words, at an edge of the plenum base 216 proximate to the intake 247, the sidewalls 234 are greater than the height of the same proximate to the distal wall 246. The tapering of the plenum base 216 can maintain the appropriate pressure and airflow characteristics along its length as air exits the 15 plenum 208 through the plurality of apertures 238.

A plurality of outlet pipes 240 can be connected to the bottom wall 236 of the plenum base 216. Each of the plurality of outlet pipes 240 can be associated with each of the plurality of apertures 238. The outlet pipes 240 can be cylindrical in shape, but the disclosure envisions different shapes, including oval, ellipsoid, rectangular, square, and the like. The outlet pipes 240 can be secured to the bottom wall 236 by means commonly known in the art, including but not limited to, pinning, welding, fastening, clamping, and the like. The outlet pipes 240 can be oriented such that an acute angle exists between the major axis of the outlet pipes 240 and the bottom wall 236 of the plenum base 216. The orientation of the outlet pipes 240 can impart the appropriate flow characteristics as air transitions from the plenum 208 to a particulate accelerator system 300.

After passing through the plenum 208 and outlet pipes 240, air generated by the blower 202 can enter a plurality of particulate accelerators 300. As shown illustratively in FIGS. 5 and 6, each of the plurality of particulate accelerators 300 can connect to each of the plurality of outlet pipes 240 through securing means engaging holes 242 and 308 on the outlet pipes 240 and a particulate accelerator 300, respectively.

Referring to FIG. 6, each of the plurality of particulate accelerators 300 can be comprised of two opposing halves 302 and 304 and secured by means commonly known in the art. In the illustrated embodiment, the two opposing halves 302 and 304 are joined by a plurality of snap-fit mechanisms 310 and a plurality of opposing holes 312 through which bolts, screws, pins, and the like, can be engaged. A gasket (not shown) can be disposed between the two halves 302 and 304 to provide a seal. Though two halves can provide for ease of manufacturing, the present disclosure envisions a unitary construction of the particulate accelerator 300. Further, the particulate accelerator 300 can be made of steel, but the disclosure contemplates other materials such as aluminum, polymers, composites, ceramics, and the like.

Extending outwardly from each opposing half 302 and 304 of the particulate accelerator 300 can be a cylindrical flange 346. Each cylindrical flange 346 can include an inner surface 314 and an outer surface 316, with which a ringed gasket 306 can be removably engaged. In particular, the ringed gasket 306 can have an inwardly extending gap 319 created to two generally coaxial surfaces 318 and 320, as shown illustratively in FIGS. 7A and 7B. The two generally coaxial surfaces 318 and 320 are sized and shaped to create an interference fit with the outer surface 316 and the inner surface 314 of the cylindrical flange 346, respectively. The ringed gasket 306 can also include an inner surface 324 and a sloped surface 326 adapted to receive a short auger tube 410 or a long auger tube 412, discussed in detail below. The ringed gaskets 306 can provide a seal between the plurality of short and long auger tubes 410 and 412 and the particulate accelerators 300, as shown illustratively in FIG. 9. The ringed gaskets 306 can maintain the seal while permitting relative movement of the short auger tubes 410 and/or long auger tubes 412 within the particulate accelerator 300 due to movement of the system as the particulate containers 104 and 106 are emptied, experience vibration, and the like. The present disclosure contemplates the short auger tubes 410 and the longer auger tubes 412 can be connected to the cylindrical flanges 346 through other means commonly known in the art, including but not limited to, pinning, clamping, fastening, adhesion, and the like.

FIGS. 8A, 8B and 8C illustrate a particulate accelerator 300 in accordance with an exemplary embodiment of the disclosure. The particulate accelerators 300 can have an inlet 330 and an outlet 332. The inlet 330 can connect to one of the plurality of outlet pipes 240 of the plenum 208 via holes 308. Similarly, the outlet 322 can connect to a discharge tube via holes 309, after which the particulate mixture can be metered to a field in any manner commonly known in the art. The connection can be through a screw, frictional fit, or any other means so as not to significantly impede the airflow through the outlet pipe 240, the inlet 330, the outlet 332 and/or the tubes. In an embodiment, releasable locking pins (245 of FIGS. 11 and 13) can engage the holes 308 and can provide for quick installation and/or removal of a particulate accelerator 300 on the plenum 208 and/or the discharge tubes on the particulate accelerator 300, thereby increasing the modularity of the system. Further, to assist in positioning the particulate accelerator 300 on the outlet pipe 240 and/or the discharge tubes on the particulate accelerator 300, raised portions 334 can be provided proximate to the inlet 330 and the outlet 332.

The inlet 330 and the outlet 332 can be associated with an inlet tube 336 and outlet tube 338, respectively. The inlet tube 336 and outlet tube 338 can extend outwardly from a generally cylindrical main body 340. The main body 340 can be integrally formed or removably connected to the inlet tube 336 and/or the outlet tube 338. One or more triangular members 347 can provide structural support for the inlet tube 336 and/or the outlet tube 338.

The main body 340 can have curved back wall 342 comprising an arc from the inlet tube 336 to the outlet tube 338. Adjacent to the curved back wall 342 can be opposing side walls 348. The opposing side walls 348 can be parallel to one another and generally parallel to the direction of airflow through the particulate accelerator 300. The cylindrical flanges 346 discussed above can extend outwardly and perpendicularly from each of the opposing side walls 348.

The cylindrical flange 346 can have a center opening 344 adapted to receive particulate from the particulate handling subsystems 400 and 401.

Figure 9:
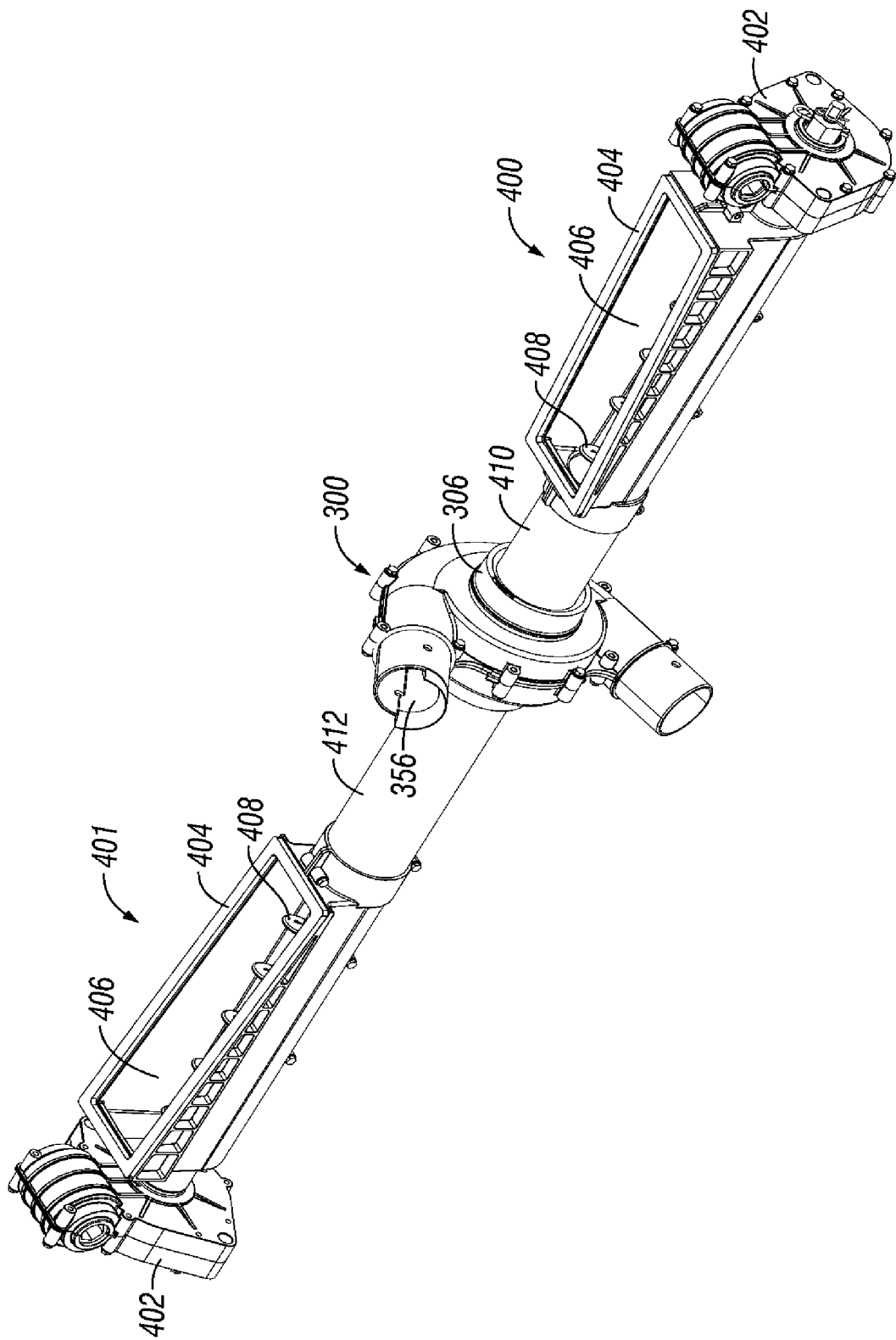
FIG. 9 is a front perspective view of a particulate accelerator and particulate handling subsystems in accordance with an illustrative embodiment.
Figure 10:
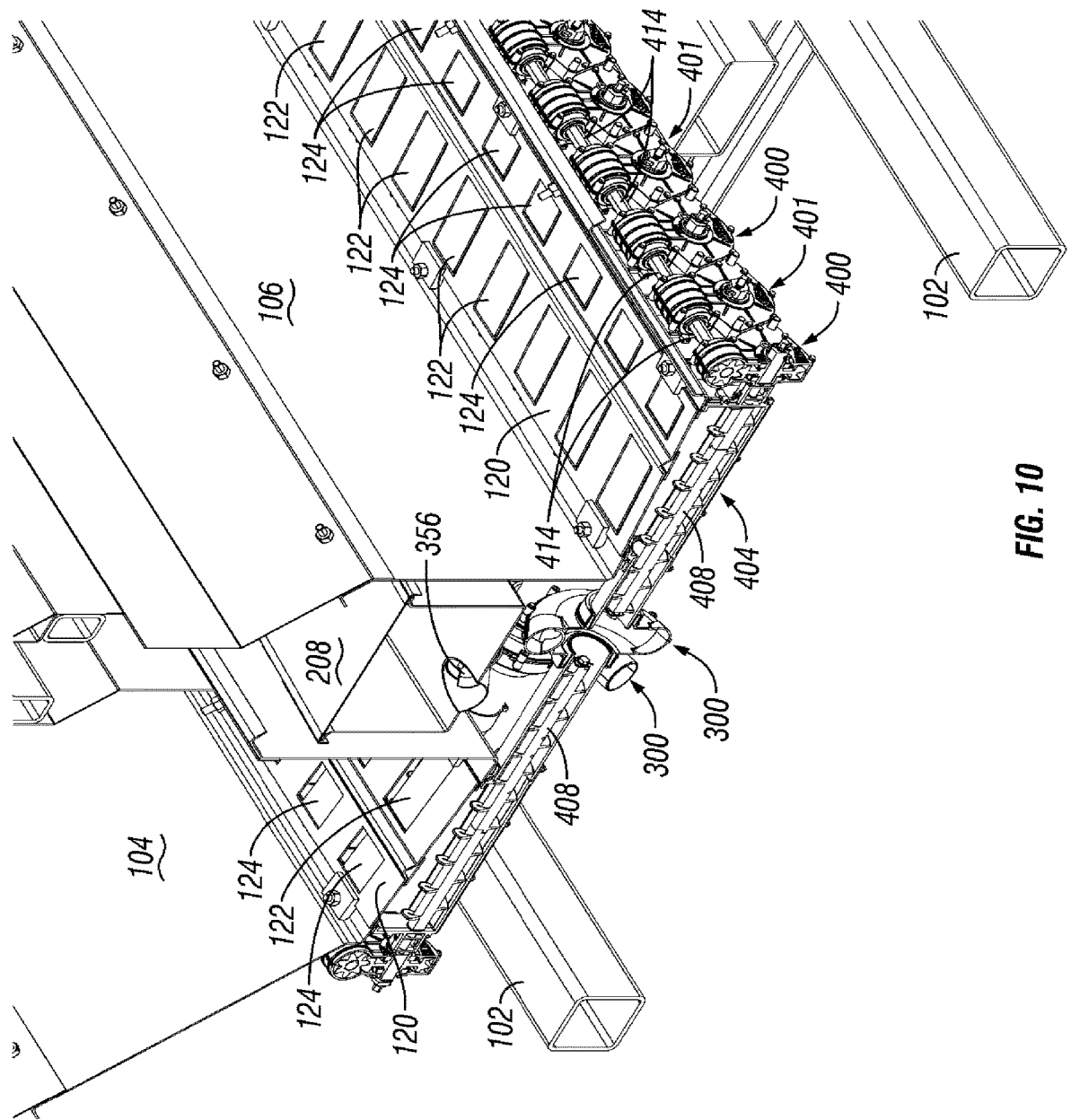
FIG. 10 is a cross-sectional view of the particulate metering implement of FIG. 1 taken along section line 10-10.
Figure 11:
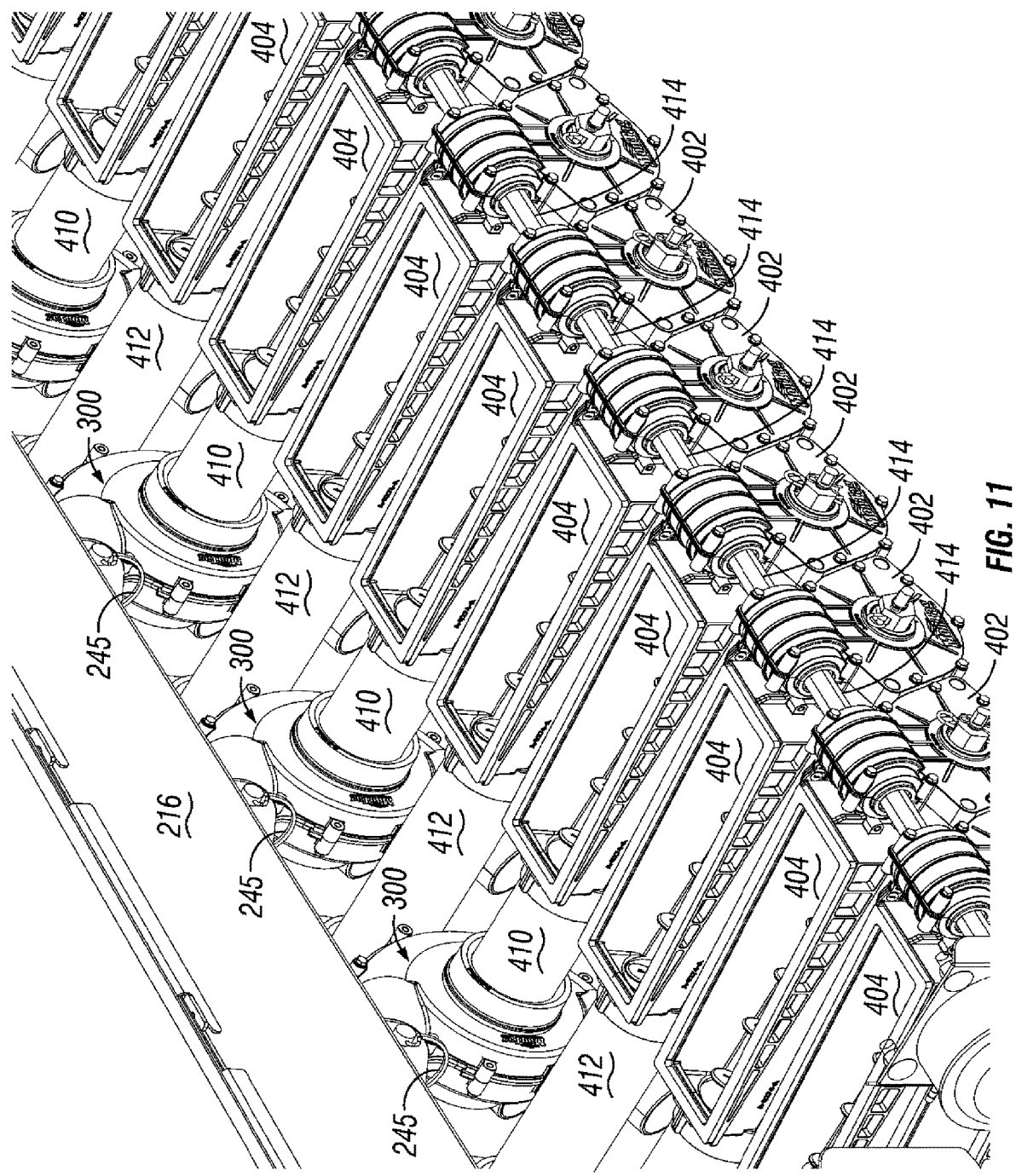
FIG. 11 is a partial front perspective view of a plurality of particulate accelerators and a plurality of particulate handling subsystems in accordance with an illustrative embodiment.

The particulate handling subsystems 400 and 401 can each include a gearbox 402, a cartridge 404, and either a short auger tube 410 or a long auger tube 412, as best shown illustratively in FIG. 9. Referring to FIGS. 9-11, the cartridge 404 can include an input slot 406 sized and shaped to receive particulate from particulate containers 104 and 106. The cartridge 404 can be constructed of two halves for ease of manufacturing or can be a unitary construction. Extending outwardly from the cartridge 404 of the particulate handling subsystems 400 and 401 is a short auger tube 410 and long auger tube 412, respectively. Within each cartridge 404 and auger tube 410 or 412 can be an auger 408 operatively connected to a gearbox 402. An opposite end of the auger tubes 410 and 412 can be disposed within the gasket 306 of the particulate accelerator 300, creating a passageway for particulate from the input slot 406 of the cartridge 404 to an interior of the particulate accelerator 300.

In operation, particulate contained within each of the particulate containers 104 and 106 passes through a plurality of gates 122 and 124 disposed within bottom trays 120, as best shown illustratively in FIG. 10. The disposed below the bottom trays 120 are the input slots 406 of cartridges 404 of particulate handing subsystems 400 and 401. The particulate passes through the plurality of gates 122 and 124 into the cartridges 404. Referring now to FIGS. 10 and 11, the gearboxes 402 receive an input force from a motor (not shown) via drive shaft 414. The gearboxes 402 can transfer the input force to the plurality of augers 408, each disposed within one cartridge 404. The augers 408 can rotate and force the particulate through the short auger tubes 410 and/or long auger tubes 412 into the particulate accelerators 300. Upon reaching the particulate accelerators 300, the particulate from each of the particulate containers 104 and 106 can mix and descend vertically within the particulate accelerators 300 due to the force of gravity.

Figure 12:
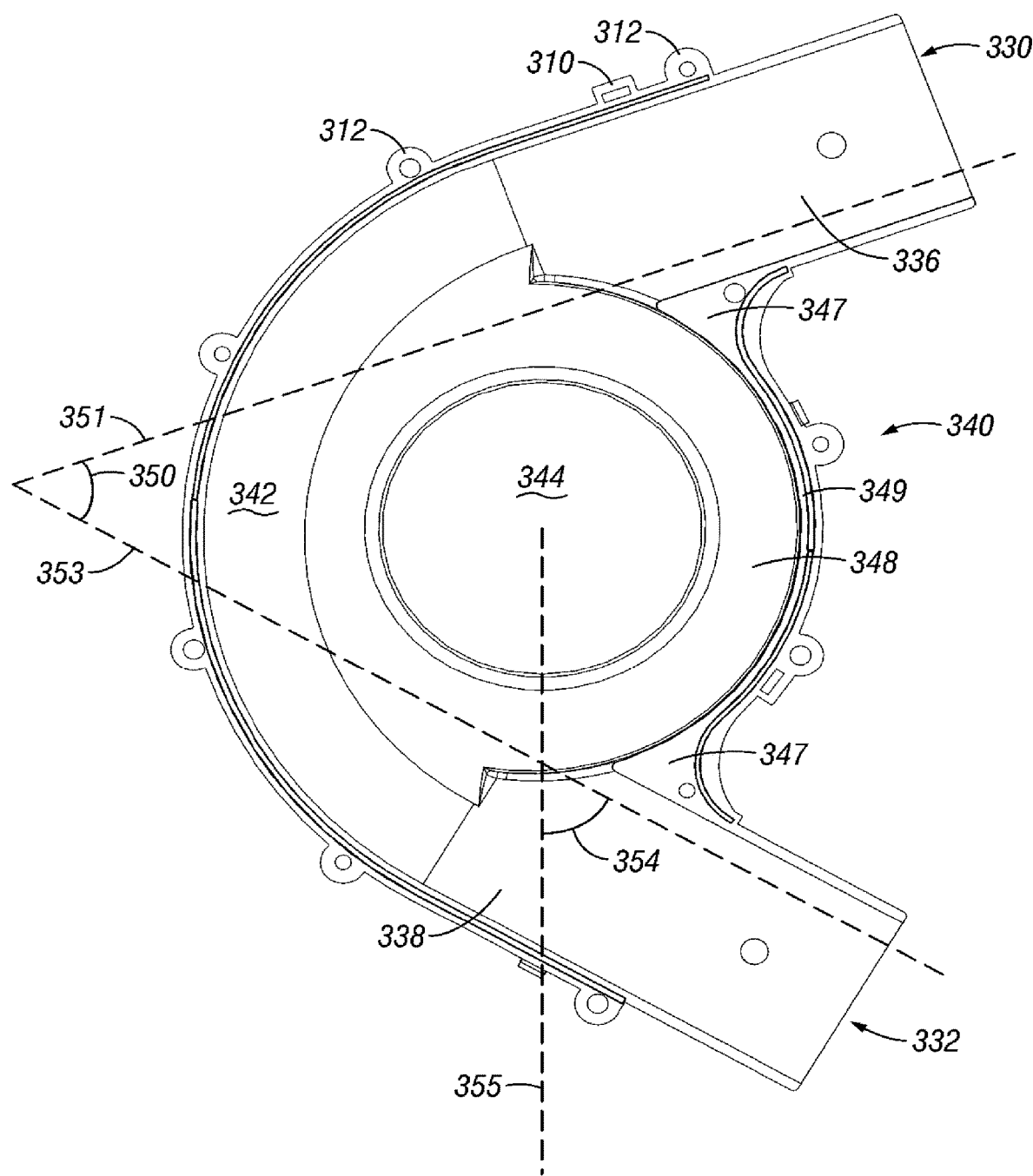
FIG. 12 is a cross-sectional view of the particulate accelerator of FIG. 8C taken along section line 12-12.
Figure 13:
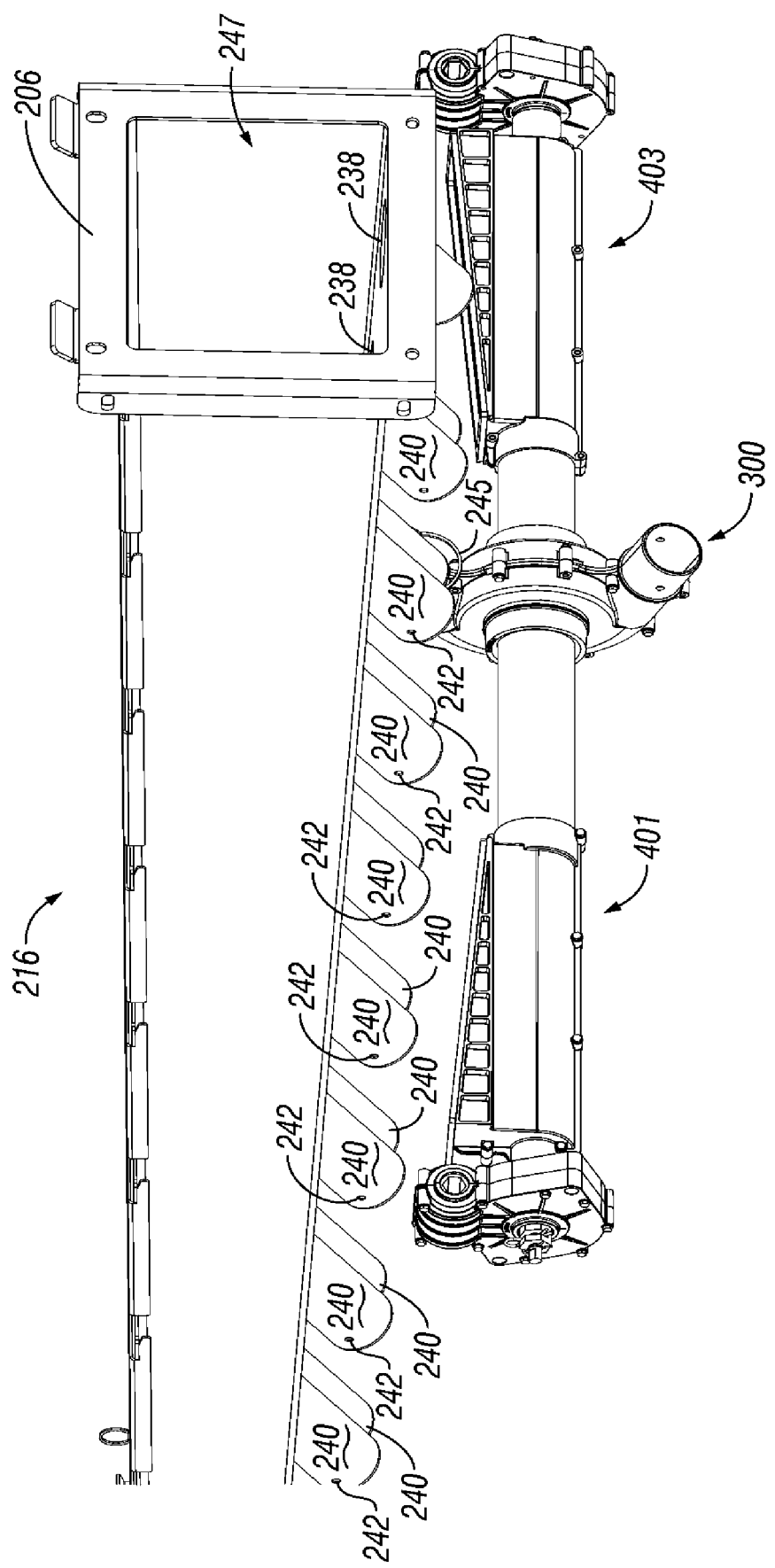
FIG. 13 is a front perspective view of a plenum, particulate accelerator and particulate handling subsystems in accordance with an illustrative embodiment.

In concurrent operation with the particulate handling subsystems 400 and 401, the blower 202 can generate a flow of air through the plenum 208. After passing through the plenum 208 and the outlet tubes 240, the flow of air can enter a particulate accelerator 300 through the inlet 330 and inlet tube 336, as shown illustratively in FIG. 12. Due to the shape of the particulate accelerator 300, particularly the angle 350 between the inlet tube 336 and the outlet tube 338, the air can track in a flow pattern around the curved back wall 342. In an embodiment, the angle 350 between the major axis 351 of the inlet tube 336 and the major axis 353 of the outlet tube 338 can be acute. In another embodiment, the angle 350 can be between thirty and sixty degrees. The disclosure also contemplates that angles 350 can be at a right angle or obtuse angle based on the desire flow characteristics through the particulate accelerator 300.

While air is tracking in a flow pattern around the curved back wall 342, the air can mix with the blend of particulate descending vertically in the particulate accelerator 300, as discussed above, and can force at least a portion of the particulate mixture through the outlet 332. Any portion of the air-particulate mixture not ejected through the outlet 332 can track in a flow along the curved front wall 349 of the main body 340, after which the air-articulate mixture and air can rejoin subsequent airflow from the inlet 330 proximate to the inlet tube 336.

An acute angle 354 can exist between the major axis 353 of the outlet tube 338 and a vertical axis 355 bisecting the center opening 344 of the particulate accelerator 300. The acute angle 354 can result in a greater distance for the particulate to descend vertically prior to contacting a bottom portion of the curved back wall 342. The greater distance can provide increased time for the air, which can be tracking in a flow pattern around the curved back wall 342, to impart horizontal force on the particulate mixture. Due to the advantageous shape of the particulate accelerator 300, the configuration can create a fluid bed to suspend the particulate as the particulate exits the outlet 332 and into a discharge tube (not shown). The fluid bed and particulate suspension can reduce the effects of wall friction between the particulate and the discharge tube. In particular, the fluid bed and particulate suspension can counteract the gravitational force on particulate traveling in the generally horizontal discharge tube and can minimize interaction between the particulate and the bottom and/or other portions of a tube. The configuration can minimize lag and increased backpressure due to wall friction and/or partial clogging. The fluid bed and particulate suspension can further eliminate complete clogging, resulting in improved particulate discharge and overall efficiency of the metering system 100.

Referring to FIG. 13, the process described above can simultaneously occur in each particulate accelerator 300 disposed along the length of the plenum 208. In an exemplary embodiment, the plenum 208 can include eighteen outlet tubes 240 to more efficiently meter eighteen row units in a field. The disclosure, however, contemplates that the plenum 208 can include any number of outlet tubes 240. In another exemplary example, the plenum 208 can include thirty-six outlet tubes 240. In yet another exemplary example, one or more of the particulate accelerators 300 can be removed from the plenum 208 by disengaging the locking pin 245, after which the outlet tube can be capped. In such an instance and other variants contemplated by the present disclosure, the particulate metering implement can be scaled up or down to any number of particulate accelerators 300 based on the needs and the context of the application (e.g., desired number of operating rows).

Referring to FIGS. 14 and 15, a dual particulate accelerator system 500 is provided. The dual particulate accelerator system 500 can include a first particulate accelerator 501 and a second particulate accelerator 502. The structure and function of each of the particular accelerators 501 and 502 can be identical to the structure and function of the particulate accelerator 300 described above.

The dual particulate accelerator system 500 can include an inlet 504, an inlet-outlet interface 506 between the first particulate accelerator 501 and the second particulate accelerator 502, and an outlet 508. The dual particulate accelerator system 500 can include a baffle 518 disposed proximate the inlet 504. The baffle 518 can restrict the flow of air through inlet tube 507 to impart the desired airflow characteristics in the first particulate accelerator 501. The present disclosure contemplates that the baffle 518 can be placed at any point within the flow of air to impart the desired airflow characteristics. The baffle 518 can be self-regulating, adjustable and/or controlled by any means commonly known in the art, including but not limited to, mechanical, electrical, electronic, pneumatic, and hydraulic controls.

The first particulate accelerator 501 can include an inlet 504, an inlet tube 507, and an outlet tube 511. A first particulate accelerator main body 503 can be integrally formed to the inlet tube 507 and/or the outlet tube 511 of the first particulate accelerator 501. The first particulate accelerator main body 503 can be comprised of two halves are secured together through a plurality of clasps, snaps or other means commonly known in the art, or composed of a single structure. The first particulate accelerator 501 can be made of steel, but the disclosure contemplates other materials such as aluminum, polymers, composites, ceramics, and the like. The first main body 503 of the first particulate accelerator can be generally cylindrical in shape. The first main body 503 can have first curved back wall 20 510 comprising an arc from the inlet tube 507 to the outlet tube 511 of the first particulate accelerator 501. Extending outwardly from the first main body 503 can be cylindrical flanges 513, upon which a gasket 520 can be disposed. The cylindrical flange 513 can have a center opening 516.

The distal portions of the short auger tubes 410 and the long auger tubes 412 can 25 create an interference fit with the gaskets 520. The auger tubes 410 and 412 can be connected to the cylindrical flanges 520 through other means commonly known in the art, including but not limited to, frictional fitting, pinning, clamping, fastenings, adhesion, and the like.

Figure 14:
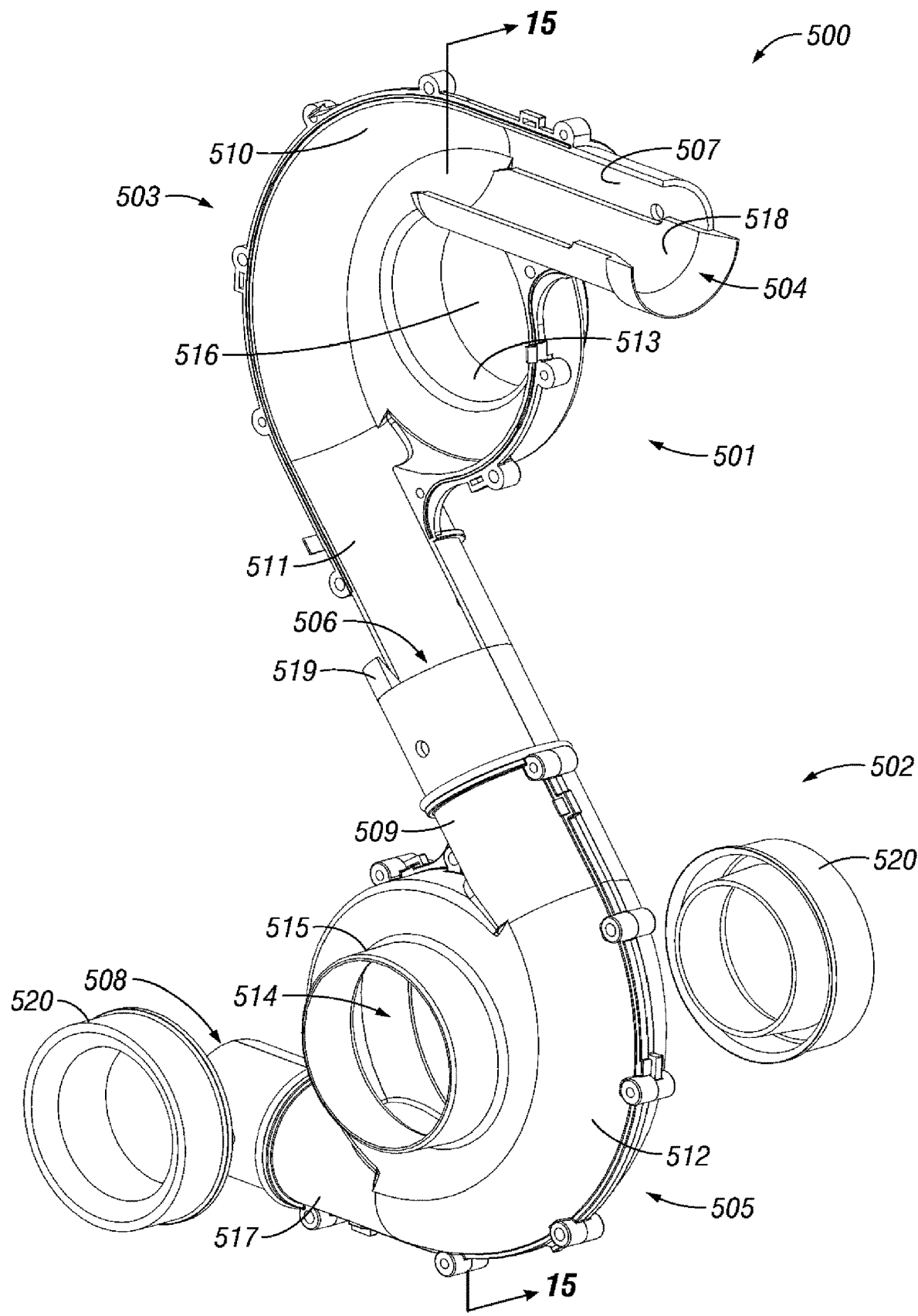
FIG. 14 is a front perspective view of a dual particulate accelerator system (with one half of a first particulate accelerator removed) in accordance with an illustrative embodiment.
Figure 15:
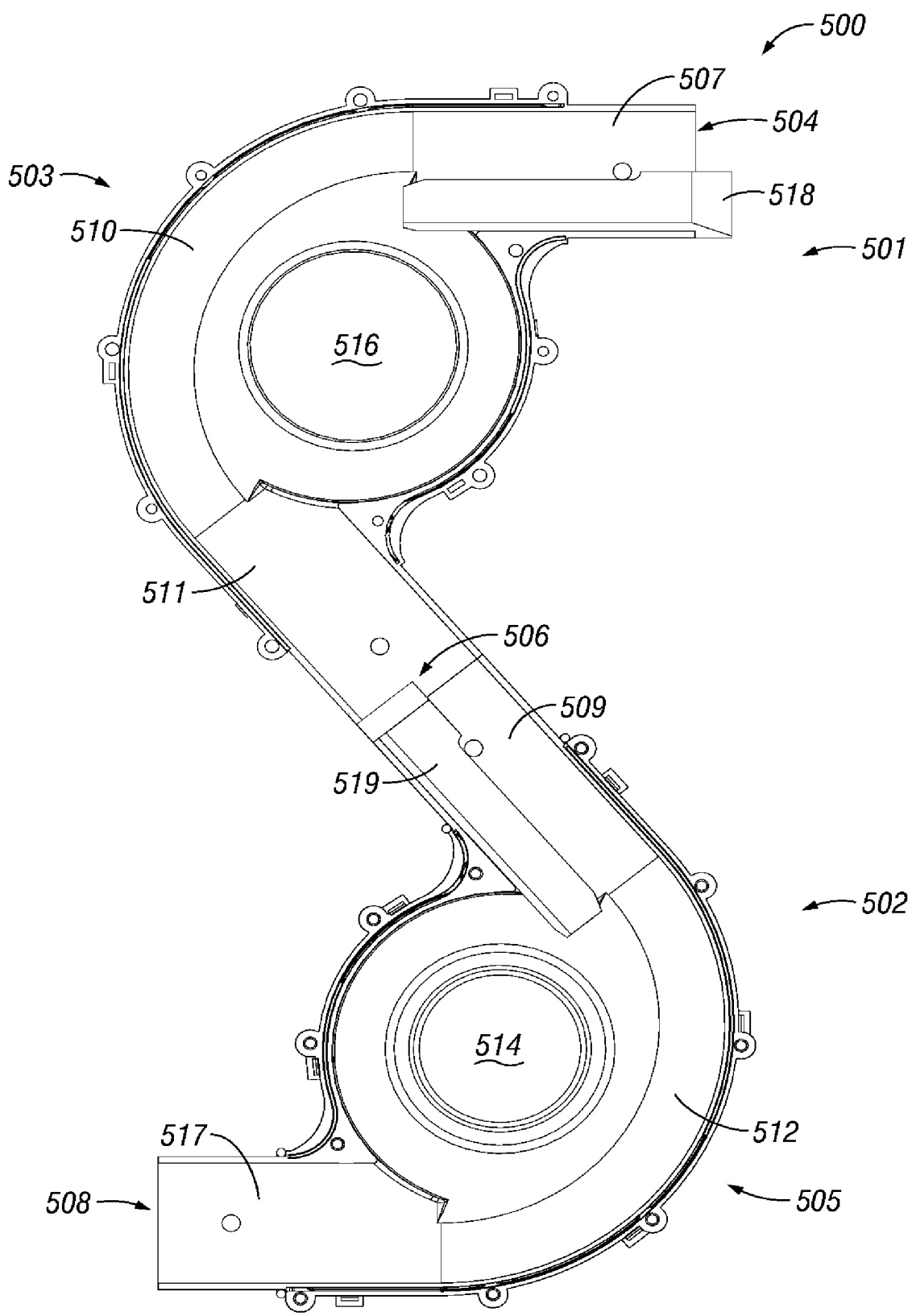
FIG. 15 is a cross-sectional side elevation view of the dual particulate accelerator system of FIG. 14 taken along section line 15-15.

Likewise, the second particulate accelerator 502 can include an inlet tube 509, an outlet tube 517, and an outlet 508, as also shown illustratively in FIGS. 14 and 15. The inlet tube 509 of the second particulate accelerator 502 can be connected to the outlet tube 517 of the first particulate accelerator 501 at inlet-outlet interface 506. A baffle 519 can extend from the outlet tube 511 of the first particulate accelerator 501, though inlet-outlet interface 506, and into the second particulate accelerator 502, as best shown illustratively in FIG. 15. The baffle 519 can restrict the flow of air through inlet tube 509 to impart the desired airflow characteristics in the second particulate accelerator 502. The baffle 519 can be self-regulating, adjustable and/or controlled by any means commonly known in the art, including but not limited to, mechanical, electrical, electronic, pneumatic, and hydraulic controls. A baffle 356 can also be implemented on particulate accelerator 300 consistent with the above disclosure, as shown illustratively in FIGS. 9 and 10.

A second particulate accelerator main body 505 can be connected to the inlet tube 509 and/or the outlet tube 517 of the second particulate accelerator 502. The second main body 505 can be comprised of two halves are secured together through a plurality if clasps or any other means commonly known in the art, or composed of a single structure. The second particulate accelerator 502 can be made of steel, but the disclosure contemplates other materials such as aluminum, polymers, composites, ceramics, and the like.

A second main body 505 of the second particulate accelerator 502 can be generally cylindrical in shape. The second main body 505 can have second curved back wall 512 comprising an arc from the inlet tube 509 to the outlet tube 517 of the second particulate accelerator 502. Extending outwardly from the second main body 505 can be cylindrical flanges 515, upon which a gasket 520 can be disposed. The cylindrical flange 515 can have a center opening 514.

The distal portions of the short auger tubes 410 and the long auger tubes 412 can create an interference fit with the gaskets 520. The auger tubes 410 and 412 can be connected to the cylindrical flanges 520 through other means commonly known in the art, including but not limited to, frictional fitting, pinning, clamping, fastenings, adhesion, and the like.

In operation, particulate from a short auger tube 410 and a long auger tube 412 can be forced by an auger 408 into the first particulate accelerator 501 through the center opening 516. Upon reaching the particulate accelerator 501, the particulate mixture, consisting of a controlled ratio of a plurality of particulates, can descend vertically within the first main body 503 due to the force of gravity. The same process can occur in the second particulate accelerator 502.

Still referring to FIGS. 14 and 15, air can enter the first particulate accelerator 501 through the inlet 504 and the inlet tube 507. Due to the shape of the first particulate accelerator 501, air can track in a flow pattern around the curved back wall 510 towards the outlet tube 511. In the process, air can mix with the particulate mixture descending vertically in the first particulate accelerator 501 and can force at least a portion of the air-particulate mixture through outlet tube 511.

The air-particulate mixture exiting the first particulate accelerator 501 can enter the inlet tube 509 of the second particulate accelerator 502. The air-particulate mixture can track in a flow pattern around the curved back wall 512 towards the outlet tube 517 and outlet 508. In the process, the air-particulate mixture can further mix with a second particulate mixture descending vertically in the second particulate accelerator 502 and can force at least portion of the air-particulate mixture through outlet tube 517.

The air-particulate mixture exiting outlet 508 can include a blend of particulates mixed in the first particulate accelerator 501 and a blend of particulates mixed in the second particulate accelerator 502. In an exemplary embodiment, the process can permit fine control of four types of particulate without sacrificing loss of airflow efficiency. After the particulate mixture and air enters a discharge tube (not shown) connected to the outlet tube 517, the particulate mixture can be metered to a field in any manner commonly known in the art. The process described above can simultaneously occur in each dual particulate accelerator systems 500 disposed along the length of the plenum 208.

The disclosure is not to be limited to the particular embodiments described herein. In particular, the disclosure contemplates numerous variations in the type of ways in which embodiments of the disclosure can be applied to providing and/or handling air flow within a particulate metering system with variable blend control and variable application rate control. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the disclosure. It is understood that any other modifications, substitutions, and/or additions can be made, which are within the intended spirit and scope of the disclosure. For the foregoing, it can be seen that the disclosure accomplishes at least all of the intended objectives.

The previous detailed description is of a small number of embodiments for implementing the disclosure and is not intended to be limiting in scope. The following claims set forth a number of the embodiments of the disclosure disclosed with greater particularity.

What is claimed is:

1. An air control system for an agricultural particulate metering implement, the air control system comprising:

a flow path having:

a. an inlet in communication with an intake;

b. an outlet in communication with one or more discharge points;

a blower in communication with the flow path at the intake, the blower providing an air flow to the flow path;

a plenum within the flow path and in fluid communication with the blower, the plenum having a plenum cover and a plenum base with opposing trapezoidal sidewalls, a bottom wall and a distal wall;

a plurality of ports disposed on the plenum and within the flow path, each one of the plurality of ports in communication with one of the one or more discharge points;

one or more air flow directing members within the flow path, each one of the one or more air flow directing members in communication with a separate one of the one or more plurality of ports and one of the one or more discharge points;

a particulate accelerator within each of the one or more air flow directing members for accelerating particulate for agricultural applications while passing through the air flow directing members;

wherein the plenum is shaped to provide graduations in air flow velocity across the plurality of ports and to proportion the air flow across the plurality of ports.

2. The air control system of claim 1, further comprising:

at least one directional bend in the flow path within each of the one or more air flow directing members.

3. The air control system of claim 2, further comprising:

a mixing area comprised of a confluence of particulate and the flow path, wherein the mixing area occurs after the at least one directional bend in the flow path within each of the one or more air flow directing members.

4. The air control system of claim 1, further comprising:

a plurality of particulate ports connected to each of the one or more air flow directing members for directing particulate through each particulate accelerator, wherein each of the plurality of particulate ports conveys particulate into the flow path for discharging air and agricultural particulate at the one or more discharge points.

5. The air control system of claim 1, further comprising:

a mixing area comprised of a confluence of particulate and the flow path within each of the one or more air flow directing members.

6. The air control system of claim 1 wherein the plenum tapers from an end proximate to the blower to a distal end.

7. The air control system of claim 1 wherein the blower produces a volumetric flow rate of 120-150 cubic feet per minute per port.

8. An agricultural particulate metering implement, comprising:

a flow path having:

c. an inlet in communication with an intake;

d. an outlet in communication with one or more discharge points;

a variable speed blower in communication with the flow path at the intake, the blower providing an air flow to the flow path for carrying agricultural particulate;

a plenum within the flow path and in fluid communication with the blower, the plenum having a plenum cover and a plenum base with opposing trapezoidal sidewalls, a bottom wall and a distal wall;

a plurality of ports disposed on the plenum and within the flow path, each one of the plurality of ports in communication with one of the one or more discharge points; and one or more air flow directing members within the flow path, each one of the one or more air flow directing members in communication with a separate one of the one or more plurality of ports and one of the one or more discharge points, wherein the plenum is shaped to provide graduations in air flow velocity across the plurality of ports and to proportion the air flow across the plurality of ports.

9. The agricultural particulate metering system of claim 8, further comprising:

at least one directional bend in the flow path within each of the one or more air flow directing members.

10. The agricultural particulate metering system of claim 9, further comprising:

a mixing area comprised of a confluence of particulate and the flow path, wherein the mixing area occurs after the at least one directional bend in the flow path within each of the one or more air flow directing members.

11. The agricultural particulate metering system of claim 8, further comprising:

a plurality of particulate ports connected to each of the one or more air flow directing members, wherein each of the plurality of particulate ports conveys particulate into the flow path.

12. The agricultural particulate metering system of claim 8, further comprising:

a mixing area comprised of a confluence of particulate and the flow path within each of the one or more air flow directing members.

13. The agricultural particulate metering system of claim 8 wherein the plenum tapers from an end proximate to the blower to a distal end.

14. An air control system for an agricultural particulate metering implement, the air control system comprising:

a flow path having:

a. an inlet in communication with an intake;

b. an outlet in communication with one or more discharge points;

a variable speed blower in communication with the flow path at the intake, the blower providing an air flow to the flow path;

a plenum within the flow path and in fluid communication with the blower, the plenum having a plenum cover and a plenum base with opposing trapezoidal sidewalls, a bottom wall and a distal wall;

a plurality of ports disposed on the plenum and within the flow path, each one of the plurality of ports in communication with one of the one or more discharge points; and one or more air flow directing members within the flow path, each one of the one or more air flow directing members in communication with a separate one of the one or more plurality of ports and one of the one or more discharge points, wherein the air flow exiting the one or more air flow directing members includes dry fertilizer particulate.

15. The air control system of claim 14, further comprising:

at least one directional bend in the flow path within each of the one or more air flow directing members.

16. The air control system of claim 15, further comprising:

a mixing area comprised of a confluence of particulate and the flow path, wherein the mixing area occurs after the at least one directional bend in the flow path within each of the one or more air flow directing members.

17. The air control system of claim 14, further comprising:
a plurality of particulate ports connected to each of the one or more air flow directing members, wherein each of the plurality of particulate ports conveys particulate into the flow path.

18. The air control system of claim 14, further comprising:
a mixing area comprised of a confluence of particulate and the flow path within each of the one or more air flow directing members.

19. The air control system of claim 14, wherein the plenum tapers from an end proximate to the blower to a distal end.

* * * * *